United States Patent [19]

Rogers

[11] Patent Number: 4,483,614

[45] Date of Patent: Nov. 20, 1984

[54] OPTICAL AIR DATA MEASUREMENT SYSTEM

[75] Inventor: Philip L. Rogers, Granada Hills, Calif.

[73] Assignee: Lockheed Corporation, Burbank, Calif.

[21] Appl. No.: 360,500

[22] Filed: Mar. 22, 1982

Related U.S. Application Data

[63] Continuation-in-part of Ser. No. 328,721, Dec. 8, 1981.

[51] Int. Cl.³ .............................. G01P 3/36; G01J 3/30; G01N 21/00
[52] U.S. Cl. ................................ 356/28.5; 250/461.1; 356/301; 356/318; 356/437
[58] Field of Search ...................... 356/28.5, 317, 318, 356/301, 435, 437, 438; 250/372, 373, 459.1, 461.1

[56] References Cited

U.S. PATENT DOCUMENTS

| | | | |
|---|---|---|---|
| 3,528,741 | 9/1970 | Benson et al. | 356/28.5 |
| 3,766,380 | 10/1973 | Menzies | 250/343 |
| 3,856,402 | 12/1974 | Low et al. | 356/28.5 |
| 3,915,572 | 10/1975 | Orloff | 356/28.5 |
| 4,071,298 | 1/1978 | Falconer | 356/73 |

OTHER PUBLICATIONS

Measures et al., *Laser Focus*, Nov. 1978, p. 49.
Sato et al., *Applied Optics*, vol. 17, No. 24, Dec. 15, 1978, p. 3890.
Yanta, ICIASF '79 Record, Sep. 1979, p. 294.
Byer, Optical & Quantum Electronics 1975, p. 147.

*Primary Examiner*—S. C. Buczinski
*Attorney, Agent, or Firm*—Frederic P. Smith

[57] ABSTRACT

A radiation fringe velocimeter subsystem and a subsystem for determining air density related parameters, are combined into a single optical system (20) which permits various important parameters associated with the operation of an aircraft to be measured at a sample location at a sufficient distance from the aircraft (or any physical attachment thereto) so that the measurements will not be subject to systemic errors such as those caused by air compression effects and airflow disturbances, and which does not require that any Pitot tubes, pressure ports or other similar mechanical devices protrude into the airstream where the measurements are to be made. The combined system (20) contains a laser (32) or other suitable source of radiation (14) as well as an optical arrangement (36, 38, 40) for transmitting the radiation from the laser (32) to a sample volume (12) in order both to form linearly independent sets of radiation fringes (98, 100) at the sample location as well as to focus the radiation (14) at the sample location so as to cause selected air molecules to fluoresce. The device also contains an optical receiving arrangement (40) for focusing backscattered radiation and fluorescent emissions from the sample volume onto one or more photodetectors (42). By using a radiation source (such as a Q-switched laser) that can be quickly switched between an On state (110) and Off state (112), it is possible to utilize a single photodetector (42), since the backscattered radiation (120) will cease as soon as the radiation is turned off, but the fluorescent emissions (186) will decay exponentially.

17 Claims, 9 Drawing Figures

FIG. 7

OPTICAL AIR DATA MEASUREMENT SYSTEM

CROSS-REFERENCE TO RELATED APPLICATIONS

This application is a Continuation-in-Part of commonly assigned Co-pending application, Ser. No. 328,721, filed Dec. 8, 1981 entitled "Compact Radiation Fringe Velocimeter for Measuring in Three Dimensions," which discloses an improved technique for measuring velocity-related parameters associated with the operation of an aircraft, such as true air speed, side slip angle, and angle of attack, and of commonly assigned Co-pending application, Ser. No. 328,476, filed Dec. 8, 1981 entitled "Fluorescent Air Data Measurement Device," which discloses a unique apparatus and method for measuring air density related parameters associated with the operation of the aircraft. The disclosure and the teachings of said Co-pending applications and the discussion of Background Art contained therein are hereby incorporated by reference the same as if fully set out herein.

TECHNICAL FIELD

The invention relates generally to the field of air data measurement systems and more particularly to an optical measurement system which both creates three-dimensional patterns of fringes at a remote sample location for the purpose of measuring the velocity of aerosol particles at that location as a function of the radiation which they scatter back to the device, and which induces fluorescence in one or more particular types of air molecules at the sample location to determine other related air data parameters such as density, pressure, and/or barometric altitude.

BACKGROUND ART

It has long been conventional to measure the relative air speed between a moving object, such as an aircraft, and the free airstream through which the aircraft is flying by means of a mechanical instrument which in effect compares the kinetic pressure exerted by the moving airstream onto a first defined area facing said airstream with respect to the static pressure exerted on a second defined area generally perpendicular to said first defined area. Typically, such a prior art system employs Pitot tubes, pneumatic tubing and pressure transducers which are exposed to the external environment and subject to not only degraded performance caused by calibration changes, but also catastrophic failures as a result of accidental breakage. Furthermore, such a prior art type of air speed measurement device physically protrudes into the airflow, with a resultant drag penalty.

The atmosphere contains many naturally occurring aerosols having a diameter on the order of from 0.1 to 10 micrometers. Examples of such aerosols are pollen and dust that naturally occur in the atmosphere. These aerosols tend to follow the motion of the atmosphere in which they are entrained and hence by observing the motion of such particles, it is possible to measure the velocity of the surrounding airstream.

Accordingly, optical techniques have also been utilized to measure wind. One such technique employed scattered sunlight as a source and cross-correlated the outputs of two radiometers having intersecting fields of view. Against localized flumes, such as the flume from a smokestack, it produced satisfactory results. A more sophisticated type of optical device measured the Doppler shift in light scattered by particles within the moving fluid to measure velocity along the system's optical axis.

There has also been used a so-called fringe laser velocimeter which measured a velocity component transverse to the instrument's line of sight by detecting the movement of aerosol particles through a layered pattern of interference fringes created by two intersecting beams of coherent laser light. Such a device has proven particularly accurate at relatively close ranges.

Another optical technique relied upon variations in refractive index moving with the wind across the line of sight of the instrument, detecting such variation by means of a so-called double-ended system having separated source and receiver.

If it is required to measure relative wind speeds in three dimensions, it would theoretically be sufficient to provide three separate systems with mutually orthogonal axes aimed at a common region of space. In practice, such an arrangement is extremely difficult to maintain in alignment and expensive to implement.

It has been proposed to utilize simultaneously two dominant colors from a single laser to form two mutually orthogonal sets of fringe planes in a common detection volume but, nevertheless, readily distinguishable from each other so that it would be possible to measure two orthogonal velocity components in the plane transverse to the velocimeter's optical axis. Alternatively, polarization or modulation by means of acousto-optic modulators may be utilized to distinguish the signals corresponding to the two components. It has also been proposed to combine two different types of velocimeters in the same system, so that two orthogonal velocity components may be measured simultaneously, one parallel to the system's main axis (by the Doppler method), and one, at right angles thereto (using the fringe method); by also using the above-mentioned two component techniques it would thus also theoretically be possible to measure simultaneously three orthogonal velocity components (one by the Doppler method, two with the fringe method).

It also has long been conventional to measure changes in altitude by means of mechanical instruments sensitive to changes in pressure of the earth's atmosphere from one elevation to another. Accordingly, it is conventional to provide an aircraft with one or more static pressure ports so that the external air pressure is exerted upon a pressure measuring diaphragm contained within the aircraft. However, significant inaccuracies may result from disturbances by the airflow in the region of the pressure port caused by icing, by air currents and turbulence, and by air compression effects or from changes in the orientation of the port relative to the airflow caused by changes in the attitude of the aircraft.

Since it is a well known law of nature that the pressure of a gas is linearly related to its density and temperature, it is also possible to compute the pressure of the air at a given elevation from measurement of other physical quantities of the air such as air density and temperature, and then to use the thus computed pressure to determine barometric altitude.

It has also been proposed to use a high power pulse laser transmitter and a receiver with range gating circuitry to look at the fluorescence or Raman scattering return signal from a localized region of the atmosphere and thus to determine concentrations of various molecular constituents in such region and, in particular, the concentration of pollutants such as NO, $NO_2$, CO, $SO_2$, and $O_3$ (nitrous oxide, nitric oxide, carbon monoxide, sulphur dioxide, and ozone).

However, taken as a whole, the known prior art does not teach or suggest how the above-mentioned optical and other related techniques may be utilized to provide a compact radiation fringe velocimeter for measuring in three dimensions. To the contrary, the known prior art suggests that at least one velocity component—that parallel to the velocimeter's main axis—should be measured by the above-described Doppler method which requires that the coherency of the radiation be maintained even after it has been scattered back towards the velocimeter where it still must be combined with unscattered light from a referenced source related in frequency and coherency to the radiation impinging upon the object, thus requiring a radiation source that is coherent and which is capable of maintaining such coherency over relatively long distances. However, the known devices which satisfy such a criterion employ a $CO_2$ laser having a relatively long wavelength that is not optimal for the relatively small aerosol particles that are naturally found in the earth's atmosphere.

Furthermore, such known prior art does not teach or suggest the considerable improvement in signal-to-noise ratio that results from utilizing a single transmit/receive lens window to focus on a single detection volume containing three sets of fringe planes oriented with respect to one another such that no two of their three respective normal vectors are either coplanar or orthogonal with respect to each other while at the same time each of the three normal vectors has a significant component in the direction of the system's main axis as well as a transverse component at right angles thereto.

Additionally, the known prior art does not teach or show how fluorescent emissions, and, in particular, how the decay characteristics of such fluorescent emissions once the fluorescent energy source has been interrupted, may be utilized to calculate air data parameters such as the relative density of a particular molecular species or, if the fluorescing molecules represent a known percentage of the atmosphere, the density, pressure and barometric altitude of the atmosphere at the elevation at which the measurement is being made.

Moreover, taken as a whole, the known prior art does not teach or suggest how air data measurements that are critical to the operation of an aircraft (such as true air speed, side slip, angle of attack, air density, air pressure, and/or barometric altitude) can be simply and reliably measured by means of an accurate and reliable measurement device free of any Pitot tubes, pressure ports or protrusions into the airstream.

Furthermore, such known prior art does not teach or suggest any reliable method for making air data measurements at a sample location at a sufficient distance from the aircraft or any physical attachments thereto that the measurement will not be subject to systemic errors of a sort that cannot always be fully compensated for such as those caused by air compression effects and airflow disturbances. The teachings and disclosures contained in the U.S. patents and the information provided by the other publications specifically cited in the two above-referenced Co-pending applications may contribute to a better understanding of the background of the present invention, as well as of its scope, function and possible manners of implementation and use; accordingly, they are hereby incorporated in their entirety by reference the same as if fully set out herein.

DISCLOSURE OF INVENTION

Two optical subsystems, namely, a radiation fringe velocimeter subsystem for measuring in three dimensions and a subsystem for inducing fluorescence in selected air molecules and thereby determining air density related parameters, are combined into a single system which permits various important parameters associated with the operation of an aircraft to be measured by means of purely optical techniques at a sample location at a sufficient distance from the aircraft (or any physical attachment thereto) so that the measurements will not be subject to systemic errors such as those caused by air compression effects and airflow disturbances, and which does not require that any Pitot tubes, pressure ports or other similar mechanical devices protrude into the airstream where the measurements are to be made.

The combined system contains a laser or other suitable radiation source (or sources) as well as an optical arrangement for transmitting the radiation from the laser to a sample volume in order both to form linearly independent sets of radiation fringes at the sample location as well as to focus the radiation at the sample location so as to cause selected air molecules to fluoresce. The device also contains an optical receiving arrangement for focusing backscattered radiation and fluorescent emissions from the sample volume onto one or more photodetectors.

In one preferred embodiment, the radiation that forms the pattern of fringes originates from a single laser having an output spectral content that results not only in a significant portion of the radiation being backscattered by the type of aerosol particles that will normally be encountered at the operational altitudes of the aircraft but which will also result in substantial fluorescence of particular molecules which comprise a known percentage of the earth's atmosphere of which Nitrogen ($N_2$) is the most prevalent.

In a second embodiment, two radiation sources are provided and the spectral content of the radiation used to create the fringe patterns is different from that used to fluoresce the air molecules. However, by the use of dichroic beam splitters or the like, both sources of radiation may be caused to propagate along a common optical path leading to the same sample volume in the external free airstream, thus permitting common receiving optical elements to function as part of both subsystems.

Whether or not the same radiation source is used both to create the radiation fringes and to fluoresce the air molecules, the resultant backscattered radiation containing the velocity information may differ in spectral content from the fluorescent emissions containing the density (pressure) information. In that case, two separate photodetectors may be each provided with a suitable optical filter such that the output of one photodetector is indicative of the present intensity of the fluorescence of the selected air molecules (and thus of air pressure and density) and the output of the other photodetector is indicative of the changing intensity of the backscattered radiation caused by the movement of aerosol particles relative to the sample volume (and thus of air speed, etc.).

By using a radiation source (such as a Q-switched laser) that can be quickly switched between an on state and off state, it is possible to utilize a single photodetector that is responsive both to backscattered radiation and to fluorescent re-emissions, since the backscattered radiation will cease as soon as the radiation is turned off, but the fluorescent emissions will decay exponentially.

BEST MODE FOR CARRYING OUT THE INVENTION

Figures 1, 2, 3:
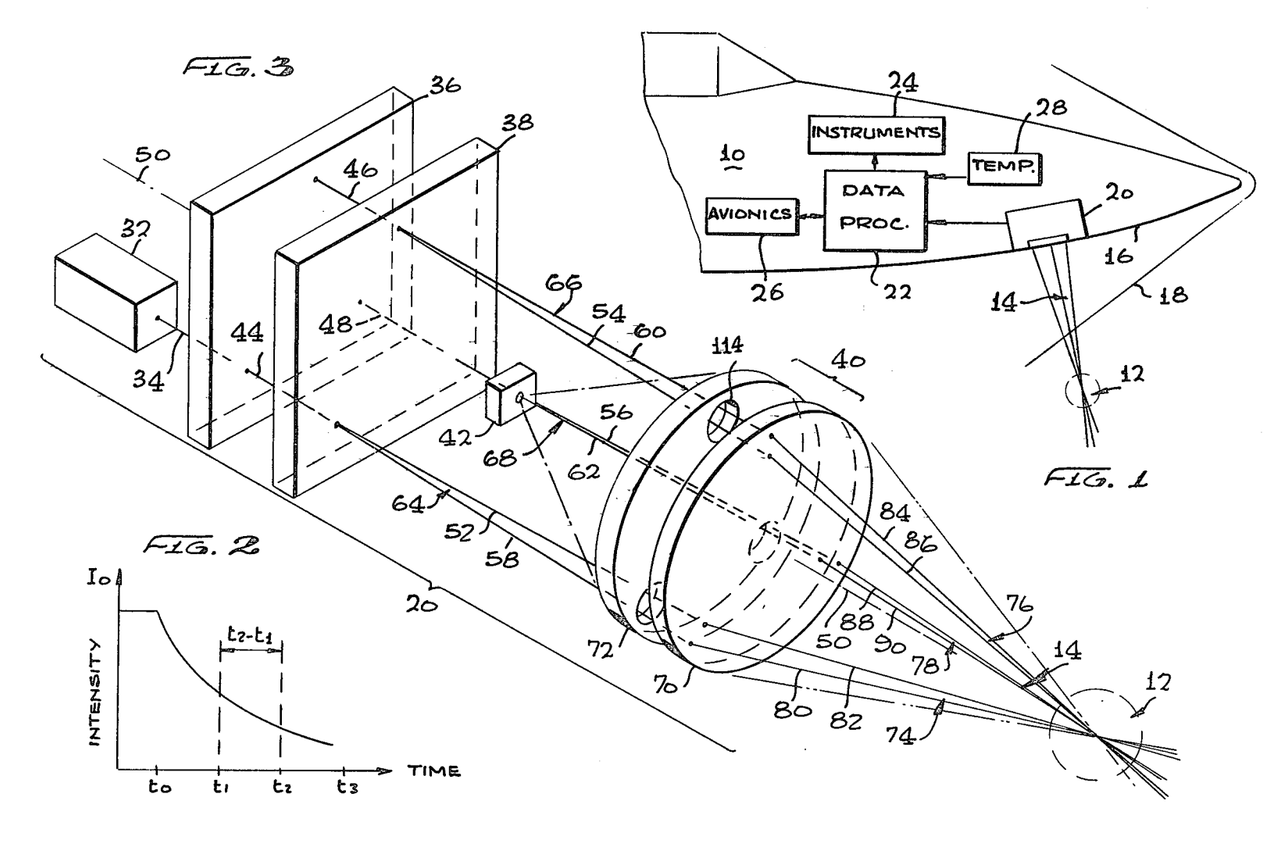
FIG. 1 shows a representative device constructed in accordance with the present invention conformally mounted inside a modern aircraft. It also shows the relationship of the air sample whose velocity and density is being measured with respect to the supersonic shock wave and skin compression effects in the vicinity of the device.
FIG. 2 is a graph showing the exponential manner in which the intensity of the fluorescent emissions will decay following the interruption of the radiation which causes the fluorescence.
FIG. 3 is an exploded isometric schematic diagram showing the major components of a first embodiment of an optical air data measurement system constructed in accordance with the present invention and their relationships to one another and with respect to the location of the air sample region at which the measurements are to be made.

Referring now to FIG. 1, it will be seen that this Figure reflects an exemplary embodiment of the present invention installed aboard a supersonic aircraft (10). A sample volume (12) is defined by the intersection of the laser beams (14) at the focal point of the transmitting optical subsystem, and is located at some distance removed from the nearest surface (16) of the aircraft (10) such that the sample volume (12) is in fact located in a portion of the airstream undisturbed by the supersonic shock wave (18).

In FIG. 1, it will also be seen that output of the receiving optical subsystem (20) is preferably conditioned by a data processor (22) prior to display by the instrumentation system (24) and utilization by the aircraft's avionics (26). The data processor (22) also has, as another input, a temperature signal provided by a conventional temperature sensing subsystem (28). (A value for temperature is required to derive the pressure of a gas from its density.)

The system in effect uses changes in induced fluorescence to measure optically the density of the air mass and changes in the backscattered radiation as the scattering particle moves relative to interference fringes to measure optically the velocity of the air.

Air density (D) combined with static temperature ($T_s$) can be used to determine pressure altitude ($P_s$):

$$P_s = D \cdot R \cdot T_s$$

where R is the ideal gas constant. Static temperature ($T_s$) is related to total temperature ($T_t$) and Mach number (M) as follows:

$$T_s = T_t(1 + 0.2M^2)^{-1}$$

For an energy source that is interrupted at regular intervals (which is normally preferred), the fluorescent light intensity decays exponentially, and if the intensity is measured at two different times, $t_1$ and $t_2$, the decay is expressed by:

$$I_2/I_1 = e^{-(t_2 - t_1)/L}$$

where L is the mean fluorescence lifetime, and is related to the mean molecular collision time and hence to the density of the gas. FIG. 2 illustrates graphically such an exponential relationship between Intensity (I) and Time (t) in which it can be seen that at equally spaced intervals of time (e.g., "$(t_1 - t_2)$") following the interruption of the energy source at time $t_0$, the intensity is successively reduced by a constant factor.

This is explainable by considering a fluorescence quenching mechanism; e.g., the Stern-Volmer mechanism. Consider a case in which a molecule M is excited, by a radiation source, to a state M*. Assume that fluorescence, collisional deactivation by M or some other molecule A, and photodecomposition are the only processes by which M* can relax. These processes can be expressed by:

$$M^* \xrightarrow{(k_1)} h \cdot \nu + M$$

$$M^* + M \text{ (or } A) \xrightarrow{(k_2)} M + M' \text{ (or } A')$$

$$M^* \xrightarrow{(k_3)} B + C$$

where $k_1$, $k_2$ and $k_3$ are reaction rate constants for the indicated processes; the lifetime L is related to these rate constants.

In the atmospheric measurement case, the third process, photodecomposition, is probably not important.

The collision rate constant is merely the mean collision rate between the excited molecule and all other molecules present. Computing the collision cross section for a molecule M colliding with another molecule (either M or A), it can be shown that the collision rate is given by:

where $n_M$, $n_A$ are the number densities of species M and A respectively, $d_{MA}$ is the average diameter of molecules M and A, k is the Boltzmann constant, T the absolute temperature, $m^*_{MA}$ is the reduced mass of molecules M and A, and Y is a symmetry factor that is 1 for $M \neq A$ and 2 for $M=A$. By multiplying and dividing by the masses of M and A, the number densities can be converted into mass densities, the quantities of interest.

Hence, by measuring the intensity of the emitted light at two different times, the mean fluorescence lifetime can be determined and the density can then be computed from the relation between mean lifetime and the collision rate calculated above.

The above-described technique has several advantages, including sensitivity to even short-lived fluorescence at low altitudes (high density, pressure), and freedom from calibration of the photodetector for absolute intensity measurement, since only relative intensity is used.

Referring now to FIG. 3, there is shown a first embodiment of the optical subsystem (20) of the present invention. It comprises a high intensity light source (32) of coherent monofrequency radiation (e.g., a primary light beam (34) produced by a laser operated in single-line mode), a beam splitting device (36) for generating a first plurality of radiation beams, a modulating device (38) for generating from said first plurality of beams a second plurality of beams each having a distinguishing characteristic, a focusing device (40) for forming separately identifiable three sets of non-orthogonal, but linearly independent, three-dimensional patterns of fringe planes, and a detector device (42).

The primary light beam (34), which in the case of the illustrated embodiment may be a coherent monofrequency light beam generated by the laser (32), is split such that approximately thirty percent of the beam is transmitted as a first secondary beam (44), thirty-five percent is transmitted as a second secondary beam (46), and thirty-five percent as a third secondary beam (48). The secondary beams (44, 46, 48) are thus of substantially equal intensity and are arranged more or less parallel to one another and spaced at approximately equal angular intervals about, and at approximately equal radial distances from, a central axis (50). The secondary beams (44, 46, 48) impinge on a modulating array of acousto-optic cells (38) at so-called "Bragg angles" $\hat{B}$ determined in accordance with the equation $$\hat{B} = \sin^{-1}(\lambda/2S)$$

where $\lambda$ is the wavelength of the entry beam and S is the wavelength of the acoustic waves within the cell. As the first, second and third secondary light beams (44, 46, 48) of the illustrated embodiment originate from a common source and thus all have the same frequency and wavelength, it will be seen that the Bragg angle associated with each of the acousto-optic modulating cells will depend only upon the particular respective modulating frequency chosen. The acoustic waves in the deflection medium inside each of the cells effectively set up a phase diffraction grating moving with the velocity of sound within the medium and having a grating spacing equal to the sound wavelength. Since the incoming beam enters the cell at the Bragg angle, a substantial percentage of the beam is diffracted from the exit side of the cell in a first order diffracted beam that is deflected from the incident light beam by an angle $-2 \cdot \hat{B}$. This deflected beam is subjected to a slight frequency displacement $\Delta f$ as a result of a Doppler effect occasioned by the movement relative to the moving acoustic wave front; the deflected beam is also phase modulated in accordance with the frequency and amplitude of the sound wave. "Bragg diffraction" is discussed in further detail in an article entitled "Elasto-Optic Light Modulation and Deflection" by E. K. Sittig appearing at pages 229 et seq. of Progress in Optics, Vol. 9, published in 1952 by North-Holland Publishing Company-Amsterdam, which discussion is incorporated herein by reference. Each of the three cells is driven at a different characteristic frequency; accordingly, each cell has its own individual Bragg angle ($\hat{B}$, $\hat{B}'$, $\hat{B}''$) at which the incoming light beam should enter. As shown in FIG. 3, in addition to the three diffracted beams (52, 54, 56) exiting from the three respective Bragg cells, three respective undeflected beams (58, 60, 62) are also present. These three undeflected beams represent the portion of the respective incoming beams (44, 46, 48) that were not diffracted (and modulated in frequency and phase) by the corresponding respective Bragg cells.

Thus, it will be seen that there is produced three beam pairs (64, 66, 68), each pair having a substantially unshifted beam (58, 60, 62) (i.e., a zero order diffraction) and a modulated beam (52, 54, 56) (the above-mentioned deflected beams).

The plane containing the two diverging beams (56, 62) of third beam pair (68) is oriented vertically (i.e., in the X-Z plane). The planes containing the first pair of beams (52, 58) and the second pair of beams (54, 60) subtend angles of $-120°$ and $+120°$, respectively, with respect to the vertical (X-Y) plane.

It will be appreciated that the individual beams could be modulated in a similar fashion by means of rotating diffraction gratings or the like. However, it should be understood that acousto-optic cells are normally preferable since they are more compact and require a minimum of maintenance.

The focusing device (40) as shown in the particular embodiment of FIG. 3 comprises a front lens element (70) and a rear lens element (72); the output beam (14) comprises a first converging beam pair (74), a second converging beam pair (76) and a third converging beam pair (78). The first converging beam pair (74) is in fact comprised of a first outer beam (80) corresponding to the undeflected input beam (58) and a first inner beam (82) corresponding to the deflected beam (52) of the first input beam pair (64). The inner beam (82) and the outer beam (84) in fact are both directed toward the central axis (50) of the window lens (40) so that all three converging beam pairs (74, 76, 78) will all converge within the same sample region (12). In similar fashion the second converging output beam pair (76) consists of a second outer beam (84) and a second inner beam (80) corresponding respectively to beams (60, 54) of the second diverging beam pair (66), while the third converging beam pair (78) consists of a third outer beam (88) and a third inner beam (90) corresponding to diverging beams (62, 56).

Figures 4, 5:
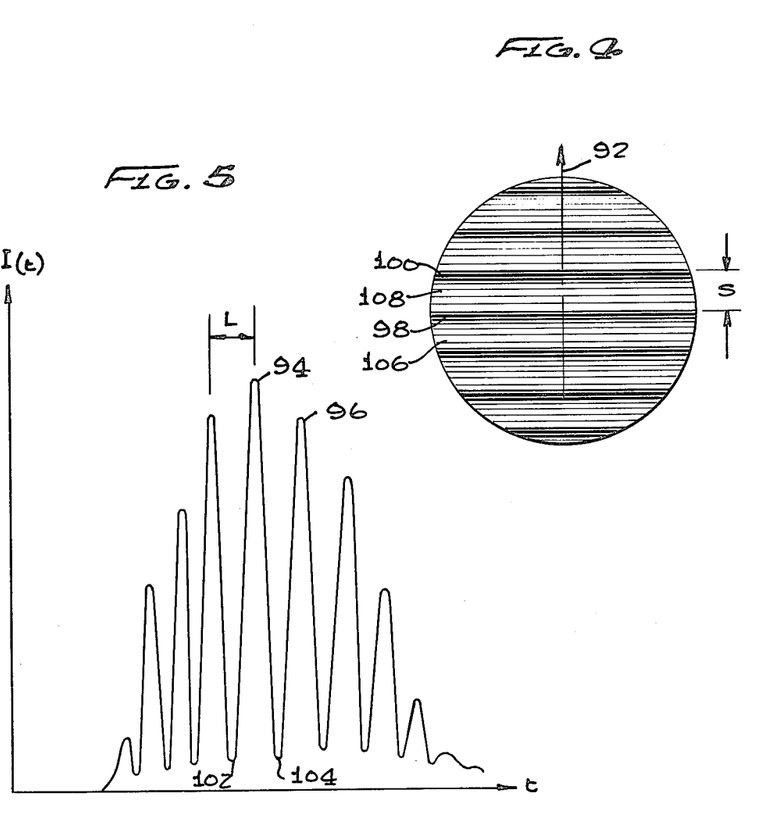
FIG. 4 is an enlarged cross-sectional view through the sample volume shown in FIG. 3, showing the formation of radiation fringes as a result of two intersecting beams of coherent light.
FIG. 5 is a graph showing variations in intensity of backscattered radiation resulting from the relative movement between the radiation fringes and the aerosol particles within the sample region.

When each converging beam pair (74, 76, 78) of the laser output beams (14) is focused at the detection volume (12), it forms a three-dimensional optical fringe pattern in the detection volume as a result of interference between the respective wave fronts. FIG. 4 is an enlarged cross-sectional view of one set of moving fringe patterns formed by the intersection of two beams of a convergent pair (e.g., beams (80, 82) of the first converging pair (74)). Each bright or dark fringe may be said to occur in a respective bright or dark fringe plane perpendicular to the plane containing the two intersecting beams and generally parallel to the bisector of the angle of intersection of the beam pair, the orientation of the fringe planes within such a fringe pattern being defined by a so-called fringe plane normal vector (e.g., vector (92)) disposed perpendicular to the fringe planes. Accordingly, the three beam pairs (74, 76, 78) form three such sets of overlapping three-dimensional fringe patterns, each having its own normal vector.

The attitude or position of the three bisectors and of the three planes respectively, containing the three beam pairs are selected such that the three corresponding fringe normal vectors (e.g., vector (92)) are disposed non-orthogonal with respect to each other and are linearly independent of one another (i.e., all three normal vectors do not lie on a common plane). Accordingly, when a small physical object (such as a particle of dust or similar aerosol) traverses the three sets of fringe patterns formed by the three beam pairs, a velocity component of the object may be measured in the direction of each of the three fringe normal vectors providing a set of three (non-orthogonal) velocity components in three dimensions. Thus, the velocity component produced by each beam pair may be measured perpendicular to the bisector of the angle subtended by, and in the plane containing, the beams of the pair (i.e., measured along the normal to the interference pattern fringe planes formed by that beam pair).

More particularly, as the aerosol particle traverses the bright and dark fringes of each of the three sets of fringe patterns, the coherent radiation from the laser (32) is scattered by the entity with a amplitude that depends on the location of the entity relative to the nearest bright fringe. As shown in FIG. 3, the scattered light is refocused by the whole of the transmit/receive lens (40) (except for the flat lens segments (114)) onto the photodetector (42). In response to the refocused light, the detector (42) provides a processor with a composite output signal representing all three non-orthogonal components of the velocity of the entity through the fringes. The processor then separates the signal into the three linearly independent, non-orthogonal velocity components corresponding to the three normal vectors, and then transforms these individual non-orthogonal velocity components to measurements in a desired orthogonal frame of reference, as described in detail in the above-referenced Co-pending application Ser. No. 328,721.

At this point it may be noted that the illustrated device will function even if the three sets of fringe patterns associated respectively with the three beam pairs (74, 76, 78) do not actually overlap but are merely located in the same general spatial volume so that the transmit/receive lens (40) may still gather light from all three sets of fringe patterns onto a single detector (42). However, when all three sets of fringe patterns overlap one another, there is a greater probability of measuring all three linearly independent components of the velocity of a single aerosol particle, since any particle having an effective cross section larger than the wavelength of the incident radiation will scatter at least some light back to the detector (42) from each of the three sets of fringe patterns.

A typical variation in magnitude of scatter intensity as an aerosol particle moves relative to such layers of bright and dark fringe planes is shown in FIG. 5. Peaks (94, 96) correspond to maximum scatter at the central bright fringe regions (98, 100) (FIG. 4) and the troughs (102, 104) (FIG. 5) correspond to substantially no scatter at the corresponding dark fringe regions (106, 108) (FIG. 4).

Figure 6:
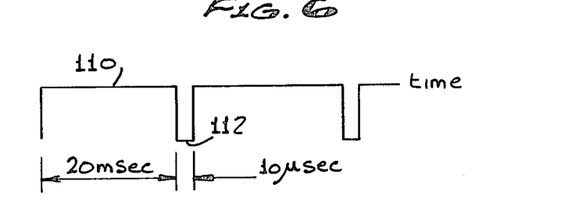
FIG. 6 is a timing diagram showing how the radiation source may be periodically interrupted to facilitate fluorescent measurements.

The optical system (20) is designed to function as the optical system of a three-dimensional fringe velocimeter such as is described in the above-referenced Co-pending application Ser. No. 328,721; however, the same components may also function as the optical subsystem of a "Co-axial" Fluorescent Air Data Measurement System similar to that described in the above-referenced Co-pending application Ser. No. 328,476 with particular reference to FIG. 2 thereof. However, rather than using a mechanical chopping disk to periodically interrupt the propagation of energy from the optical subsystem (20) to the sample region (12), the laser (32) is switched on and off (preferably by means of an internal Q-switch) in accordance with the timing diagram of FIG. 6. The laser (32) is preferably a continuous wave type of laser that may be operated at a relatively high duty factor—as indicated in FIG. 6, a 20 millisecond "On" (110) followed by a 10 microsecond "Off" (112). Thus, for at least 99.95% of the time, the optical subsystem (20) may be generating the three sets of non-orthogonal linearly independent moving interference fringe planes in accordance with the requirements of the velocity measuring subsystem. The remaining 0.05% or less of the time, the radiation source (32) is switched off and the photodetector (42) measures only the exponential decay of the fluorescent emissions originating from the sample region (12). The radiation source for inducing the fluorescence originates with the laser (32) which, as noted previously, has an output in the form of a beam (34) that is split into three secondary beams (44, 46, 48) which are modulated to form three beam pairs (54, 56, 58) resulting in a total of six individual beams which are all focused by front lens (70) onto sample region (12). By using a laser having an optical spectrum that will induce selected air molecules (for example, Nitrogen ($N_2$) molecules) to fluoresce, the output of the photodetector (42) which has its field of view concentrated on sample region (12) will be a function of the intensity of the fluorescence. It should be noted that the velocimeter function of the apparatus is dependent only upon the frequency with which the amplitude of the output from the photodetector (42) is modulated. The fact that a constant fluorescence phenomenon is occurring in the same region of space at which the aerosol particles are crossing from a dark interference fringe plane to a bright interference fringe plane or vice versa will only serve to provide a constant bias to the amplitude of the photodetector's output and will not affect the frequency spectrum from which the velocity measuring subsystem extracts the velocity data.

The fluorescent re-emissions radiating from the sample region (12) towards the window lens (40) are focused by the combination of the front lens (70) and the rear lens (72) onto the photodetector (42).

By appropriate choice of the frequency of the light emitted by the laser (32), it is possible to cause only one particular molecular species within the atmosphere to fluoresce with sufficient intensity for such fluorescence to affect the output of the detector (42). Thus, if the molecular species of interest is Nitrogen ($N_2$) (and in that regard, it should be remarked that the proportion of $N_2$ within the atmosphere is relatively constant, at least at the elevations at which aircraft are normally operated, and therefore the density of $N_2$ within a given sample of atmospheric air will be a reliable indication of the air pressure and barometric altitude in the vicinity of the sample), then the $N_2$ molecules in the sample region, rather than other species not of interest, may be caused to fluoresce by means of, for example, an $N_2$ laser. It should be emphasized that although a transmit/receive lens (40) is shown as being the means for projecting the six laser radiation beams and three sets of interference fringe plane patterns onto the detection volume (12) and for focusing the backscattered radiation and fluorescent re-emissions from the detection volume onto the detection device (42), it would be a simple matter well within the level of skill of the average artisan to substitute other functionally equivalent means for projecting and/or focusing, such as a concave reflective surface of optical quality formed on the front of a suitably shaped support. In that case the window function of the lens (40) could be satisfied by means of a suitable thickness of a transparent material, possibly provided with self-cleaning segments analogous to those disclosed in the above-referenced Co-pending application Ser. No. 328,721.

The above-described arrangement has an advantageous self-aligning characteristic even if the transmit/receive lens assembly (40) is mounted independently of the other components, thereby permitting the transmit/receive lens to be rigidly flush-mounted in the skin of the airplane (10), while permitting the other components contained inside the aircraft (e.g., the laser (32), and the beam splitters/modulators (36, 38)) to be isolated from vibrations and/or to be conveniently removed and replaced for maintenance without disturbing the window and its associated seal.

It will be appreciated that it is preferable (on account of strength, cost, weight, ease of replacement, and other similar considerations) for the window to have a maximum diameter (or other equivalent effective aperture dimension) that is relatively small. In particular, it is essential that the distance that separates the detection volume from the window and the rest of the aircraft's surface be significantly greater than the thickness of the boundary layer formed at the surface of the aircraft. For most applications it is desirable that the distance separating the detection volume from the surface of the aircraft be at least 0.5 meters and preferably in excess of 1 meter. On the other hand, for most applications, the maximum practical window size is less than 0.5 meters. Thus, as a general rule, the effective window aperture dimension should be less than the distance between the window and the sample.

Figure 7:
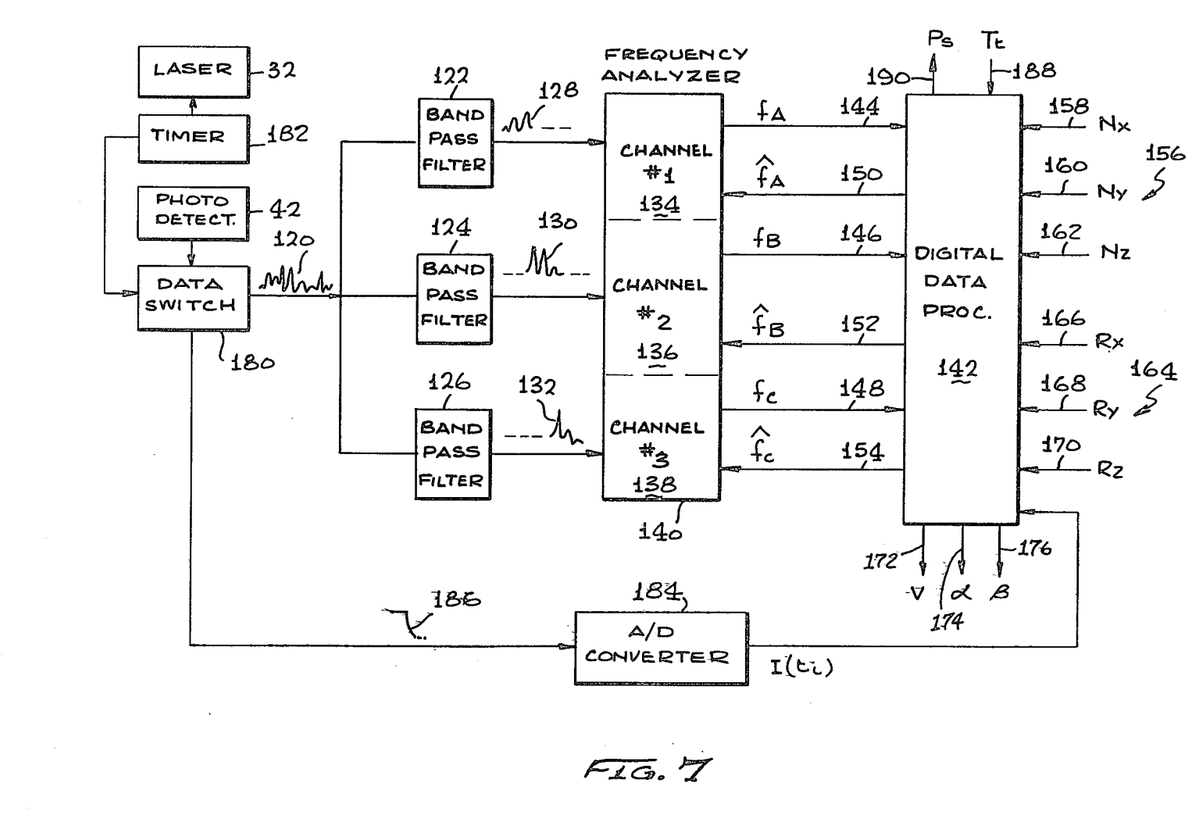
FIG. 7 is a block schematic diagram illustrating how the output of a single photodetector may be processed to provide air speed, angle of attack, side slip and altitude information.

Referring now specifically to FIG. 7, it will be recalled that this Figure is a block diagram depicting schematically the flow of raw data through the various signal processing and conditioning subsystems. The photodetector (42) generates a raw data output signal (120) which corresponds to the variation in intensity of the backscattered light received from sample volume area (12) through the transmit/receive lens (40) (FIG. 3). It will be recalled that each of the three acousto-optic cells (38) had its particular associated acoustic frequency which resulted in each of the three different sets of fringe planes having its own distinguishing modulation frequency that will be imparted to the scattered light as the fringe planes move relative to a "stationary" aerosol particle. Since the three modulating frequencies are selected such that a "moving" particle will still result in the scattered light being modulated at a frequency that still is contained within three frequency bands centered about the three modulation frequencies and since the three modulating frequencies are sufficiently separated from one another that the three associated frequency bands associated with the three sets of fringe planes do not overlap—at least for the range of particle velocities anticipated—it is thus possible to separate the raw output signal (120) (depicted as a single burst of frequencies), by means of three separate conventional band pass filters (122, 124, 126); the raw output signal may thus be divided into a low frequency component (128), a mid-frequency component (130) and a high frequency component (132), respectively corresponding to the fringe planes associated with first normal vector $N_a$, second normal vector $N_b$, and third normal vector $N_c$. These three signal components are input into three respective channels (134, 136, 138) of a conventional frequency analyzer (140) which processes successive such frequency burst components to derive a corresponding fundamental frequency from the background noise and to output a digital indication thereof to the digital data processor (142). This is indicated symbolically in the Figure by the provision of a first output (144) labeled $f_a$ from the first channel (134), a second output labeled $f_b$ (146) from the second channel (136), and a third output labeled $f_c$ (148) from the third channel (138).

Preferably, the frequency analyzer (140) is provided with an adaptive tracking capability whereby it concentrates its search for the desired fundamental frequency component about a known or predicted value thereof. This is indicated diagrammatically in the Figure by the provision of three digital signals from the data processor (142) to the frequency analyzer (140) labeled respectively $\hat{f}_a$ (150), $\hat{f}_b$ (152) and $\hat{f}_c$ (154). To derive these three predicted frequencies, the data processor (142) has the benefit of accelerometer data and rate-gyro data from the aircraft's guidance system. This is indicated symbolically in the Figure by the provision of a first set of inputs (156) respectively labeled $N_x$ (158), $N_y$ (160), and $N_z$ (162) which represent digital indications of acceleration in the aircraft's X, Y and Z axes, and by the provision of a second set of similar inputs (164) respectively labeled $R_x$ (166), $R_y$ (168) and $R_z$ (170) corresponding to digital representations of the aircraft's angular velocity about its X, Y and Z axes, respectively. It should be readily apparent, that given the magnitude and orientation of such accelerations and changes in attitude, it then becomes a relatively simple computation to estimate near term changes in the relative velocity between particles in the free airstream located at a particular orientation with respect to and at a particular distance from the aircraft's center of gravity and the resultant increase or decrease in the frequency with which such a particle will interrupt the successive fringes of each of the three sets of moving fringe patterns. In particular, such an estimation may make use of the mathematical technique known as the "Kalman Filter" whereby such frequency changes may be predicted with reasonable accuracy even when the frequency analyzer is unable to make an accurate measurement of the actual frequency because of a poor signal-to-noise ratio, sudden perturbations in the signal caused by fleeting gusts of wind and the like and by the failure of the photodetector (42) to output any meaningful signal for some interval of time as the result of the temporary absence of any suitable aerosol particles within the actual sample volume.

In any event, the data processor (142) produces three velocity output signals (which may be either analog or digital, or both), identified in the drawings by the symbol V (172), α (174) and β (176) respectively corresponding to true air speed, angle of attack and angle of side slip. As a result of the particular signal processing system design illustrated in the Drawings, the output of the data processor will effectively be a composite of data measured by the fringe velocimeter with data measured by conventional accelerometers and rate gyroscopes. However, it should be appreciated that by so combining directly measured data with predicted data, not only is the system able to overcome the adverse effects of what might otherwise be a poor signal-to-noise environment (especially when an aircraft is flying at very high altitudes and/or a relatively low-powered laser is being utilized to measure velocity of particles at a relatively great distance), but also the cumulative integration errors inherent in an accelerometer-based system are minimized.

Still referring to FIG. 7, it will be noted that a data switch (180) is located in a signal path between the photodetector (42) and the three band pass filters (122, 124, 126). A timer (182) provides a timing signal to switch the laser (32) On and Off (as described previously with reference to FIG. 6); at the same time it also controls the data switch (180). Thus, when the laser (32) is switched On and the interference fringes are present in the sample volume (12), the sample output by the photodetector (42) is coupled through the switch (180) to the three band pass filters (122, 124, 126) as aforesaid. On the other hand, when the laser (32) is switched Off, then the switch (180) couples the output of the photodetector (42) to an analog to digital (A/D) converter circuit (184) which digitizes the exponentially decayed signal (186) then being output from the photodetector (42) as the result of the exponential decay of the intensity of the fluorescent re-emissions at discrete time intervals $t_i$, which is accordingly input to the data processor (142) in digital form. The data processor (142) is also provided with a digital temperature signal $T_t$ (188). From these two inputs and also from the air speed measurement V (172), the data processor (142) is thus able to derive a digital signal $P_s$ (190) representing the pressure altitude of the aircraft in accordance with the physical equations discussed previously with reference to FIG. 1.

Figure 8:
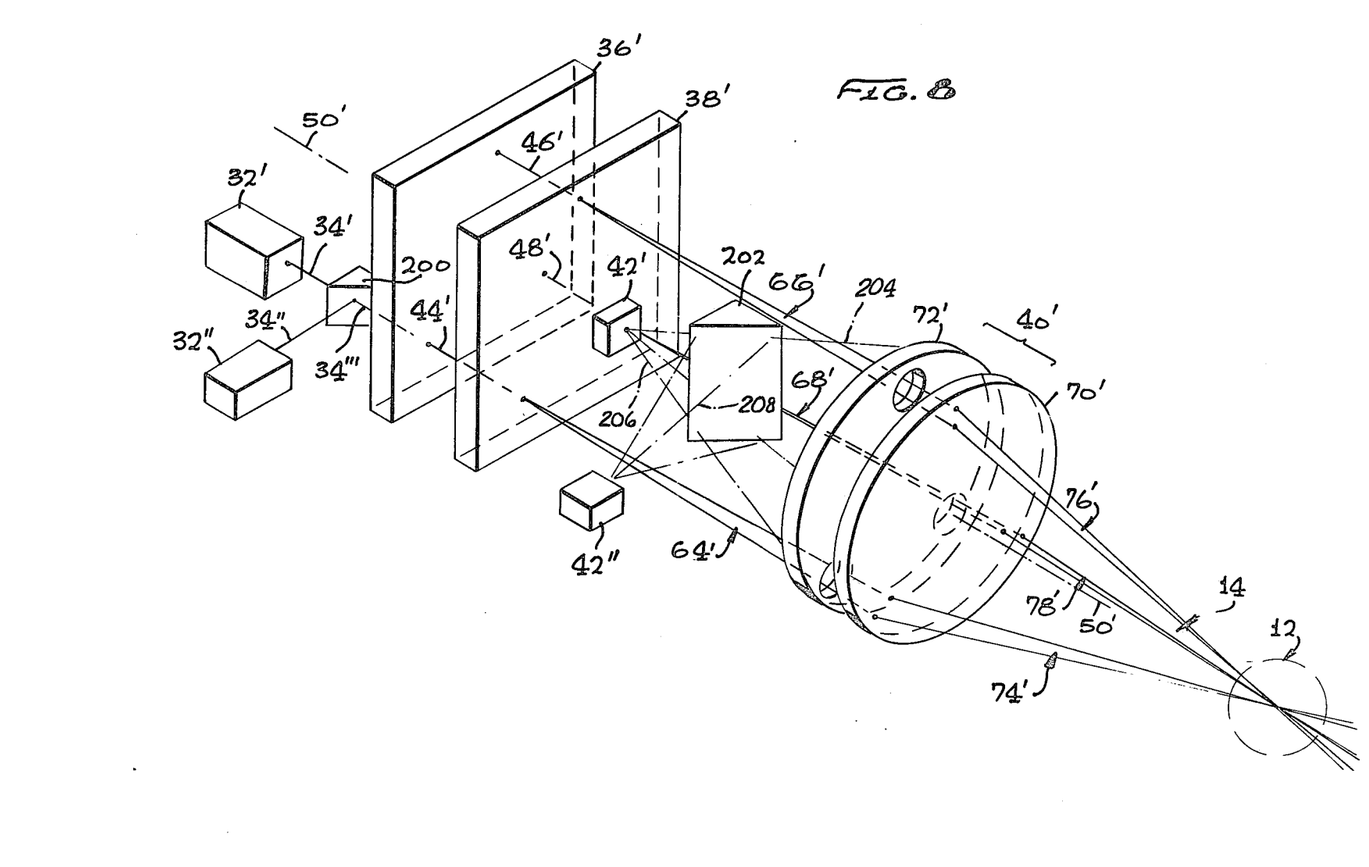
FIG. 8 shows an alternative embodiment generally similar to that of FIG. 3, but employing more than one radiation source and more than one photodetector.
Figure 9:
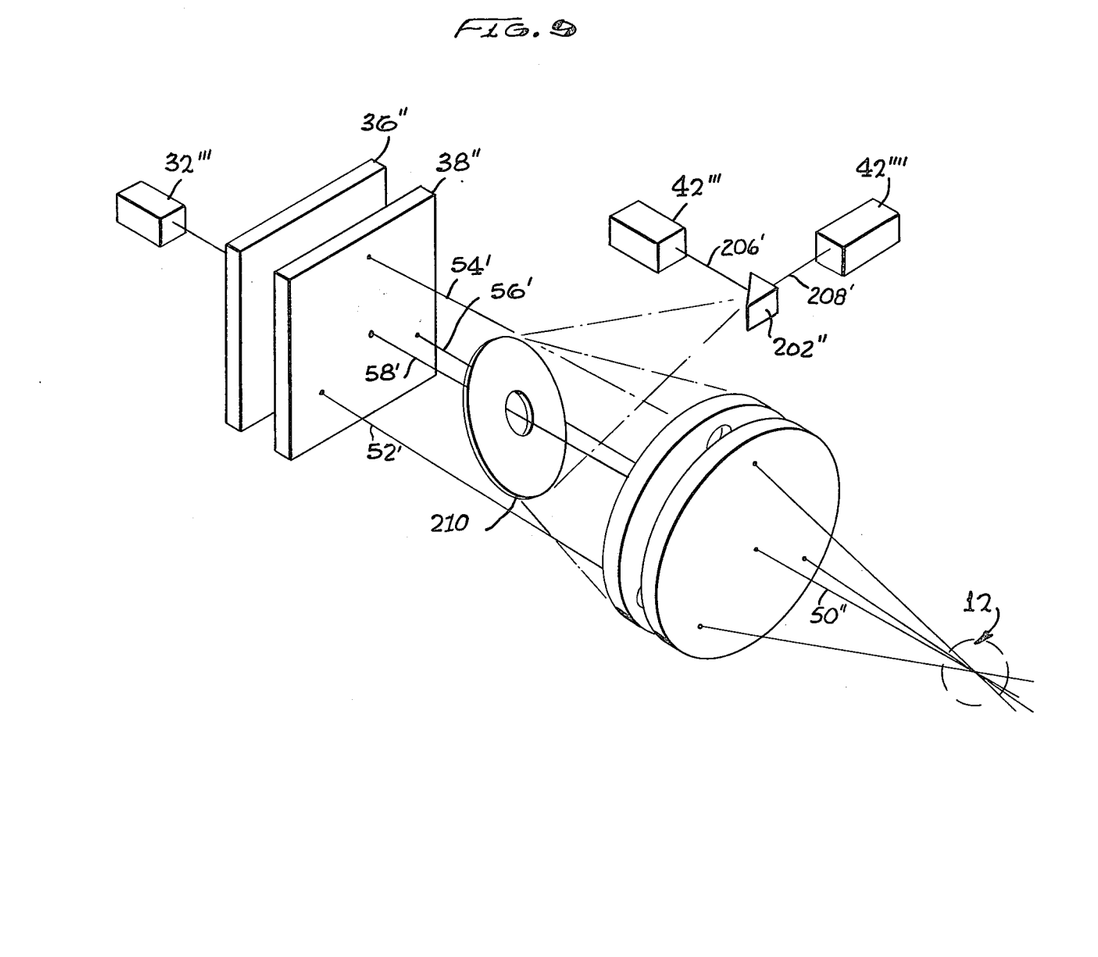
FIG. 9 shows a second alternative embodiment generally similar to that of FIGS. 3 and 8 in which a plurality of optical pathways is provided from the radiation source to the sample volume for the purpose of creating radiation fringes, but only a single optical pathway is provided between the radiation source and the sample volume for the purpose of inducing fluorescence.

Reference should now be made to FIGS. 8 and 9 which, it will be recalled, show alternative embodiments generally similar to that of FIG. 3 but employing more than one radiation source and/or more than one photodetector. Accordingly, components generally similar in construction and function to specific components of the FIG. 3 embodiment will bear the same reference numbers with the addition of a "prime" symbol ('). Where components that are somewhat analogous to components shown in the FIG. 3 embodiment have been replaced with several components, then double prime (") and triple prime ('''), etc. symbols will also be employed.

Referring now specifically to the embodiment of FIG. 8, it will be seen that two separate laser radiation sources are provided. A primary laser source (32') that provides the radiation that forms the moving interference fringe planes utilized to make the velocity measurements associated with the velocimeter subsystem. Thus, as discussed in more detail in the above-referenced Co-pending application, Ser. No. 328,721, the laser (32') should preferably be of a type that may be continuously operated and provides a well-collimated beam of coherent light of a sufficiently short wavelength relative to the diameter of a typical atmospheric aerosol particle that a substantial backscattering will occur as the aerosol particles that naturally occur in the atmosphere pass through the interference fringe planes created in the sample region (12) by the velocimeter subsystem. There is also provided a second radiation source (32") that functions as the radiation source for the altimeter subsystem. Thus, as described in more detail in the above-referenced Co-pending application, Ser. No. 328,476, the spectral content of the second laser (32") should be such as to cause a measurable degree of fluorescence of particular air molecules within the sample region (12) at the altitudes and pressures for which the system will be utilized.

A dichroic mirror (200) is utilized to combine the output beam (34') from the first laser (32') with the output beam (34") of the second laser (32") to form a combined output beam (34''') that is functionally analogous to the output beam (34) of the FIG. 3 embodiment, except that its spectral and coherency characteristics will be a combination of the respective characteristics of the two input beams (34', 34"). Combined beam (34''') is divided into three beams (44', 46', 48') by the beam splitter (36'), these three beams being oriented at approximately 120° intervals about the central axis (50'). These three beams are then modulated into three diverging beam pairs (64', 66', 68') by the acousto-optic modulator assembly (38') and are focused by the front element (70') of the window lens assembly (40') into three converging beam pairs (74', 76', 78') that each have their point of intersection centered within the sample region (12) to thereby form interference fringe planes as described previously with reference to the FIG. 3 embodiment. Since the three converging beams (74', 76', 78') also contain radiant energy originating from the second laser (32"), accordingly, the particular air molecules in the sample region (12) that are sensitive to the radiation (34") from the second laser (32") will fluoresce.

Both elements of window lens assembly (40'), namely, the front element (70') and rear element (72'), serve as the primary components of the receiving optics, whereby not only the backscattered radiation from the aerosol particles as they pass through the interference fringes but also the fluorescent re-emissions from the particular air molecules excited by the radiant energy from the second laser (32") are focused both onto a first photodetector (42') and onto a second photodetector (42"). A second dichroic mirror (202) separates the received energy (204) into a first component (206) that has been backscattered from the aerosol molecules and a second component (208) that is associated with the fluorescent re-emissions from individual air molecules with the first component (206) being directed toward the first photodetector (42') and the second component being directed to the second photodetector (42").

It should be understood that such a form of construction employing a dichroic mirror (202) in the path of the received radiation is operable only if there is a significant difference in spectral content between the above-described components of received radiation (206, 208). Otherwise, the single photodetector arrangement (42) of the FIG. 3 embodiment may be employed.

Alternatively, as discussed above with reference to FIG. 3, in the event that a single laser radiation source (32) results in two distinct types of received radiation differing substantially in their respective spectral content, then by means of a suitable beam splitter (such as dichroic mirror (202) of the FIG. 8 embodiment), two individual photodetectors may be employed, each sensitive to only one type of radiation.

Reference should now be made to FIG. 9 which shows yet another possible embodiment of the optical components utilized to focus the radiation received from the sample volume (12) onto two photodetectors (42''', 42''''). It should be noted that this particular embodiment does not employ three separate beam pairs such as were shown in the embodiments of FIGS. 3 and 8 but rather three separate modulated output beams (52', 54', 56') and a single central unmodulated beam (58'). Such a form of construction is discussed in detail with particular reference to FIG. 7 in the above-identified Co-pending application, Ser. No. 328,721, and is but one example of a number of different optical arrangements utilizing refracting and/or reflecting optical elements that may be utilized to transmit and focus laser radiation onto a sample volume and to gather and receive the resultant radiation from the sample volume and focus it onto the photodetector or other radiation measurement device.

Particularly convenient from the perspective of the present invention is the provision of an auxiliary focusing element in the optical receiving subsystem, namely, a convex reflector (210) that is tilted with respect to the central axis of the optics (50''), so as to permit the use of two off-axis detectors (42''', 42''''), with the two radiation components (206', 208') that are focused onto the two photodetectors (42''', 42'''') being separated by a dichroic mirror (202''').

While the invention has been described in detail with respect to certain specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

INDUSTRIAL APPLICABILITY

Accordingly, it will be seen that an optical air data measurement system constructed in accordance with the teachings of the present invention may be utilized in many different types of instrumentation systems, such as provided for use aboard an aircraft, in which case air flight data measurements of variables such as air density, altitude, air speed, angle of attack and side slip angle may be made with enhanced accuracy and reliability.

I claim:

1. An air data system for measuring air speed data and air data parameters, such as density, pressure, and/or barometric altitude, at a remote air sample location comprising:
   a source of radiation,
   first means for transmitting said radiation to said sample location,
   second means for receiving backscattered radiation scattered in the direction of said source of radiation resulting from the illumination of particulate matter at said sample location by said transmitted radiation,
   third means for measuring variations in the intensity of said received backscattered radiation,
   fourth means for converting the intensity variations so measured into said air speed data,
   fifth means for inducing at least one molecular species within the air at said sample location to emit fluorescence,
   sixth means for measuring the intensity of said fluorescence, and
   seventh means responsive to the measured fluorescent intensity for computing said air data parameter.

2. The air data system of claim 1, wherein said air data system is installed aboard an aircraft and said remote air sample location is external to and spaced from said aircraft essentially undisturbed by the flight of said aircraft.

3. The air data system of claim 2, wherein said matter consists of suspended solid or liquid particles in the free airstream at said remote sample location.

4. The system of claim 3, wherein said first and second means includes at least one common focusing element through which radiation from said source of radiation is transmitted in a first direction from inside said aircraft to said sample location outside said aircraft and through which also is transmitted in a second direction generally opposite to said first direction said backscattered radiation and said fluorescence from said sample location outside said aircraft to said third means and to said sixth means inside said aircraft.

5. The air data system of claim 1, wherein said fifth means includes means for periodically varying the intensity of said fluorescence and wherein said seventh means computes said air data parameter from the rate of change of said fluorescent intensity.

6. The air data system of claim 1 wherein said first means includes optical means for producing at least one three-dimensional pattern of radiation and transmitting said pattern to said sample location.

7. The air data system of claim 1 wherein said first means includes optical means for producing simultaneously three sets of non-orthogonal, but linearly independent, three-dimensional patterns of radiation, each of said sets having its own distinguishing characteristic.

8. The air data system of claim 7 wherein each of the sets has a normal vector having a significant component in the direction of the main axis of the system as well as a transverse component at right angles thereto.

9. An optical air data measuring system for measuring air speed data and air data parameters, such as density, pressure, and/or barometric altitude, comprising:
   a laser velocimeter for measuring the velocity of suspended particles at a remote sample location so as to be representative of the motion of an external free airstream, said velocimeter comprising:
   a laser for providing a coherent source of radiation,
   optical means for directing said radiation from said laser along at least two beams of coherent laser light,
   focusing means for producing from said beams at least one three-dimensional pattern of radiation and for projecting said pattern onto said remote location,
   detection means for measuring the intensity of backscattered radiation directed towards said focusing means by said particles as they pass through said pattern, and
   computing means for converting variations in the measured backscattered radiation into a velocity measurement; and an optical densimeter comprising:

means for periodically inducing at least one particular type of molecule within the air at said sample location to fluoresce and re-emit radiation, photodetector means for measuring the intensity of said emitted fluorescence, and means for computing said air data parameter from said measured fluorescence intensity;

wherein said velocimeter focusing means includes a common transmit/receive element which projects said three-dimensional pattern of radiation onto said sample location and also receives said backscattered radiation and said fluorescent radiation from said sample location and directs same to said velocimeter detection means and to said densimeter photodetector means.

10. The optical air data measuring system of claim 9, wherein said optical densimeter further comprises switching means for periodically causing said emitted fluorescence to decay in intensity and wherein said densimeter computing means is responsive to the rate of said decay.

11. The optical air data measuring system of claim 9 wherein said optical means and said focusing means produces simultaneously three sets of non-orthogonal, but linearly independent, three-dimensional patterns of radiation, each of said sets having its own distinguishing characteristic.

12. The optical air data measuring system of claim 11 wherein each of said sets has a normal vector having a significant component in the direction of the main axis of the system as well as a transverse component at right angles thereto.

13. An optically based air data measuring system for use aboard an aircraft in flight for measuring air speed data and air data parameters, such as density, pressure, and/or barometric altitude, comprising:

a laser velocimeter contained within said aircraft for measuring the velocity of aerosol particles at a sample location external to and spaced from said aircraft so as to be representative of the motion of the free airstream in the vicinity of said aircraft essentially undisturbed by the flight of said aircraft, said velocimeter comprising:

a laser for providing a coherent source of radiation;

beam splitting means for separating said radiation from said laser into at least two distinct beams, focusing means for projecting said two beams onto said sample location to produce a three-dimensional pattern of radiation having alternating bright and dark fringes, window means provided in the skin of said aircraft for providing an aperture transparent to the radiation provided by said laser, detection means for measuring the intensity of radiation scattered by an aerosol particle in the vicinity of said sample location back to said window means resulting from the occupation of said bright fringes by one or more of said aerosol particles, and computing means for converting variations in the measured backscattered radiation into a velocity measurement;

whereby the air speed of an aircraft may be optically measured by means of equipment wholly contained within the skin of said aircraft;

an optical densimeter comprising:

means for periodically interrupting said radiation from said laser, whereby at least one particular type of representative molecules within the air at said sample location will be induced to fluoresce and re-emit radiation, said re-emitted fluorescent radiation decaying in intensity following the interruption of said radiation from said laser, photodetector means for measuring differences in intensity of said emitted fluorescence as it decays, and means for computing said air data parameter from said measured intensity differences;

wherein said densimeter utilizes the same energy source as is utilized by said velocimeter;

wherein said velocimeter focusing means includes a focusing lens through which said laser light beams are transmitted from said laser located inside said aircraft to said sample of air located outside said aircraft and through which also is transmitted the backscattered laser light and the fluorescent emissions from said sample outside said aircraft to said velocimeter detection means and to said densimeter photodetector means located inside said aircraft;

wherein said window means aperture is also transparent to said re-emitted fluorescent radiation; and wherein said velocimeter air sample also functions as the air sample for said densimeter;

a temperature measuring subsystem comprising a temperature sensor for sensing the temperature in the vicinity of said sample location; and an accelerometer subsystem comprising:

means for measuring changes in angular velocity of said aircraft, means for converting said changes in measured angular velocity into a correction factor relating the translational three-dimensional velocity of said self-contained optically based air data measuring system with respect to the center of gravity of said aircraft, and means for applying said correction factor to the measured velocity of said aerosol particles relative to said air data measuring system whereby the velocity of said aircraft may be determined.

14. An optically based air data measuring system for use aboard an aircraft in flight for measuring air speed data and air data parameters, such as density, pressure, and/or barometric altitude, comprising:

a laser velocimeter contained within said aircraft for measuring the velocity of aerosol particles at a sample location external to and spaced from said aircraft so as to be representative of the motion of the free airstream in the vicinity of said aircraft essentially undisturbed by the flight of said aircraft, said velocimeter comprising:

a laser for providing a coherent source of radiation;

beam splitting means for separating said radiation from said laser into at least two distinct beams, focusing means for projecting said two beams onto said sample location to produce a three-dimensional pattern of radiation having alternating bright and dark fringes, window means provided in the skin of said aircraft for providing an aperture transparent to the radiation provided by said laser, detection means for measuring the intensity of radiation scattered by an aerosol particle in the vicinity of said sample location back to said window means resulting from the occupation of said bright fringes by one or more of said aerosol particles, and computing means for converting variations in the measured backscattered radiation into a velocity measurement;

whereby the air speed of an aircraft may be optically measured by means of equipment wholly contained within the skin of said aircraft;

an optical densimeter comprising:

means for periodically interrupting said radiation from said laser, whereby at least one particular type of representative molecules within the air at said sample location will be induced to fluoresce and re-emit radiation, said re-emitted fluorescent radiation decaying in intensity following the interruption of said radiation from said laser, photodetector means for measuring differences in intensity of said emitted fluorescence as it decays, and means for computing said air data parameter from said measured intensity differences;

wherein said densimeter utilizes the same energy source as is utilized by said velocimeter;

wherein said velocimeter focusing means includes a focusing lens through which said laser light beams are transmitted from said laser located inside said aircraft to said sample of air located outside said aircraft and through which also is transmitted the backscattered laser light and the fluorescent emissions from said sample outside said aircraft to said velocimeter detection means and to said densimeter photodetector means located inside said aircraft;

wherein said window means aperture is also transparent to said re-emitted fluorescent radiation; and wherein said velocimeter air sample also functions as the air sample for said densimeter; and an accelerometer subsystem comprising;

means for measuring changes in angular velocity of said aircraft, means for converting said changes in measured angular velocity into a correction factor relating the translational three-dimensional velocity of said self-contained optically based air data measuring system with respect to the center of gravity of said aircraft, and means for applying said correction factor to the measured velocity of said aerosol particles relative to said air data measuring system whereby the velocity of said aircraft may be determined.

15. An optically based air data measuring system for use aboard an aircraft in flight for measuring air speed data and air data parameters, such as density, pressure and/or barometric altitude, comprising:

a laser velocimeter contained within said aircraft for measuring the velocity of aerosol particles at a sample location external to and spaced from said aircraft so as to be representative of the motion of the free airstream in the vicinity of said aircraft essentially undisturbed by the flight of said aircraft, said velocimeter comprising:

a laser for providing a coherent source of radiation;

beam splitting means for separating said radiation from said laser into at least two distinct beams, focusing means for projecting said two beams onto said sample location to produce a three-dimensional pattern of radiation having alternating bright and dark fringes, window means provided in the skin of said aircraft for providing an aperture transparent to the radiation provided by said laser, detection means for measuring the intensity of radiation scattered by an aerosol particle in the vicinity of said sample location back to said window means resulting from the occupation of said bright fringes by one or more of said aerosol particles, and computing means for converting variations in the measured backscattered radiation into a velocity measurement;

whereby the air speed of an aircraft may be optically measured by means of equipment wholly contained within the skin of said aircraft;

an optical densimeter comprising:

means for periodically interrupting said radiation from said laser, whereby at least one particular type of representative molecules within the air at said sample location will be induced to fluoresce and re-emit radiation, said re-emitted fluorescent radiation decaying in intensity following the interruption of said radiation from said laser, photodetector means for measuring differences in intensity of said emitted fluorescence as it decays, and means for computing said air data parameter from said measured intensity differences;

wherein said densimeter utilizes the same energy source as is utilized by said velocimeter;

wherein said velocimeter focusing means includes a focusing lens through which said laser light beams are transmitted from said laser located inside said aircraft to said sample of air located outside said aircraft and through which also is transmitted the backscattered laser light and the fluorescent emissions from said sample outside said aircraft to said velocimeter detection means and to said densimeter photodetector means located inside said aircraft;

wherein said window means aperture is also transparent to said re-emitted fluorescent radiation; and wherein said velocimeter air sample also functions as the air sample for said densimeter; and a temperature measuring subsystem comprising a temperature sensor for sensing the temperature in the vicinity of said sample location.

16. The optically based air data measuring system of claim 15 wherein said beam splitting means and said focusing means produces simultaneously three sets of non-orthogonal, but linearly independent, three-dimensional patterns of radiation, each of said sets having its own distinguishing characteristic.

17. The optically based air data measuring system of claim 16 wherein each of said sets has a normal vector having a significant component in the direction of the main axis of the system as well as a transverse component at right angles thereto.

* * * * *